United States Patent [19]

Staba et al.

[11] 3,846,937
[45] Nov. 12, 1974

[54] PRODUCTION OF ALLERGENS BY PLANT TISSUE CULTURE TECHNIQUE

[75] Inventors: E. John Staba; Ali Shafiee, both of Minneapolis, Minn.

[73] Assignee: The Regents of the University of Minnesota, Minneapolis, Minn.

[22] Filed: Mar. 29, 1973

[21] Appl. No.: 346,074

[52] U.S. Cl.................................. 47/58, 424/91
[51] Int. Cl............................................ A61k 23/00
[58] Field of Search........................... 47/58; 424/91

[56] References Cited
UNITED STATES PATENTS

| | | | |
|---|---|---|---|
| 2,747,334 | 5/1956 | Routien et al. | 47/58 |
| 3,514,900 | 6/1970 | McDade | 47/58 |
| 3,591,677 | 7/1971 | Kramer | 424/91 |
| 3,628,287 | 12/1971 | Staba et al. | 47/58 |
| 3,683,550 | 8/1972 | Corlett et al. | 47/58 |
| 3,704,546 | 12/1972 | Hardy et al. | 47/58 |
| 3,710,512 | 1/1973 | Tamaki et al. | 47/58 |

Primary Examiner—Robert E. Bagwill
Attorney, Agent, or Firm—L. Paul Burd

[57] ABSTRACT

Allergens such as antigen E are present in the leaves, stems and pollen of the short ragweed plant (Ambrosia elatior L.). Antigen E is widely accepted as the most potent allergen in the plant, and it is of utility for developing assays for patient hypersensitivity testing and allergenic product evaluation. The purification of antigen E is costly and difficult. Clinical and laboratory evidence indicates that short ragweed leaf plant tissue cultures produce an allergen of significant potency when compared to N.I.H. reference antigen E, and that it is of higher purity when examined by comparative disc electrophoresis. The allergens produced from tissue culture systems may be more economically produced than from pollen and may be more desirable for patient hypersensitivity evaluation and assay of allergenic products.

12 Claims, No Drawings

PRODUCTION OF ALLERGENS BY PLANT TISSUE CULTURE TECHNIQUE

FIELD OF THE INVENTION

This invention relates broadly to the isolation of purified antigen from plant sources by plant tissue culture techniques. One of the most common diseases seen by a clinician is hay fever, and ragweed is implicated in a large proportion of the cases. Allergens such as antigen E are present in the leaves, stems and pollen of the ragweed plant. Antigen E, the most potent allergen in the plant, is of interest for assaying patient hypersensitivity to ragweed and in evaluation of allergenic products. The purification of antigen E from plant members is difficult and costly. There has been developed clinical and laboratory evidence that ragweed leaf plant tissue cultures produce a closely related antigen E allergen of higher purity and significant potency, and produces other allergens. The efficacy of the product clinically suggests that it might substitute for allergens. Techniques similar to that employed with ragweed can be used to grow valuable materials from other plant sources.

THE PRIOR ART

Plant tissue culture systems are often used for both biochemical experiments and to study their potential use to produce a wide variety of plant secondary products. Recent studies have been directed toward the production of enzymes, ginseng saponins, steroids, opium alkaloids, anthroquinones and other compounds. Representative prior art patents include Staba et al. U.S. Pat. No. 3,628,287 issued Dec. 21, 1971 for Production of Diosgenin by Plant Tissue Culture Technique; Routien et al. U.S. Pat. No. 2,747,334 issued May 29, 1956 for Cultivation of Plant Tissue; and Metz et al. German Pat. No. 1,216,009 published May 5, 1966 for Procedure for the Cultivation of Differentiated Root Tissues.

Many of the physical and chemical properties have been established for antigen E, a highly reactive short ragweed pollen protein allergen. Antigen E is present in leaves and stems as well as the pollen.

Tissue culture techniques are reviewed in "Plant Tissue Culture as a Technique for the Phytochemist" by E. John Staba, appearing in Recent Advances in Phytochemistry, 1970. As defined therein, callus cultures are masses of unorganized plant cells. If the tissue is grown on a solid medium it is a static culture, and if in a liquid medium it is a suspension culture. A culture is referred to as a primary culture during its first aseptic growth cycle. Only upon being subcultured does a primary culture become a cell line and qualify as a tissue culture. Callus tissue containing cellular organization internally or externally are referred to as differentiated or organized cultures.

SUMMARY OF THE INVENTION

Short ragweed leaf (Ambrosia elatior L.) was grown as callus and suspension cultures. Immunodiffusion tests against anti-pollen crude extract and anti-antigen E sera did not detect antigen E in the tissue cultures. However, two allergenically active fractions were isolated from the tissue cultures by ammonium sulfate precipitation, DEAE-cellulose and filtration gel (Sephadex G-100) chromatography. Two fractions isolated (Sephadex G-100, Fractions II and III) were electrophoretically homogeneous and carried net charges similar to that of antigen E in polyacrylamide disc electrophoresis at pH 8.9, and had molecular weights of 10,000–15,000 and 30,000–40,000 rspectively. These fractions were highly skin reactive in individuals sensitive to short ragweed pollen.

DESCRIPTION OF THE PREFERRED EMBODIMENTS

Static and suspension cultures were prepared as follows: Short ragweed seeds (Ambrosia elatior L.) were grown in the University of Minnesota pharmacy greenhouse until 1 month old (approximately 30 cm tall). Leaves, stems and roots were washed in sterile distilled water, surface sterilized in 2.5 percent sodium hypochlorite solution for 10 minutes, and rinsed three times in sterile distilled water. Two small incisions were made on leaf sections (1 × 2 cm), stem sections (2 cm), and root sections (2 cm) with a sterile scalpel prior to their transfer to sterile one ounce square vials containing 18 ml of revised Murashige's and Skoog's tobacco (RT) or Prairie Regional Laboratory $B_5$ (PRL) media supplemented with 1 percent agar and various concentrations of 2,4-dichlorophenoxy-acetic acid (2,4-D) as a plant growth regulator.

Seeds were soaked in 8 percent sucrose solution for 24 hours, washed three times with sterile distilled water, and surface sterilized in 2.5 percent sodium hypochlorite solution for 30 minutes under reduced pressure. After rinsing with distilled water, these seeds were allowed to germinate on sterile water-moistened filter paper in Petri dishes. Germinated seeds were transferred onto medium with 1 ppm 2,4-D, and although callus was formed it was not successfully subcultured.

Callus tissues formed best from short ragweed leaves cultured on RT medium with 1 ppm of 2,4-D ($RT_1$). Six week old primary callus browned and did not grow well when subcultured on $RT_1$, $RT_2$, $PRL_1$ and $PRL_2$ medium. However, suspension cultures were established when approximately 4 g fresh weight of primary leaf callus tissues were aseptically transferred to 500 ml Erlenmeyer flasks containing 100 ml of $RT_2$ medium. The suspension cultures were shaken on a rotary shaker Mode-53 (New Brunswick Corp., New Jersey) at 80 rpm and 24° C. At 2 week intervals approximately 5 g fresh weight of suspension cells were transferred to 100 ml of $RT_2$ medium. Callus cultures were established by transferring 2 g fresh weight of second generation suspension cells aseptically to 1 ounce vials containing 18 ml of $RT_1$, agar medium.

Two week old suspension and 4 week old callus cultures were harvested and examined for allergens. Suspension cultures were filtered through four layers of muslin cloth, and further clarified by filter paper filtration. The pH of the combined medium filtrates was adjusted from 5.4 to 7 with 3N ammonium hydroxide, and 0.1 percent sodium azide was added as preservative. The harvested cells and preserved medium were stored at −10° C until extracted.

1. Allergen Isolation Procedure

A modification of the procedure of King et al. (1964 – Isolation and Characterization of Allergens from Ragweed Pollen. Biochem. 3: 458–468) was used to isolate the allergens from short ragweed leaf callus and suspension cultures.

Fourth generation callus (Expt I, Table 1, 625 g fresh weight), and combined fourth and fifth generation suspension cultures (Expt II, Table 1, 1,787 g fresh weight) were sonified prior to extraction with a Branson Sonifier Model S-12 (Danbury, Connecticut). Tissue aliquot (65 g) was mixed with iced 0.005 M phosphate buffer pH 7.5 containing 0.1 percent sodium azide and sonified for 2 minutes at 90 watts to form a uniform suspension. The combined sonified cell suspensions were shaken overnight at 80 rpm and 24° C, filtered, and the pH of the filtrate adjusted from 6.3 to 7 with 3 N ammonium hydroxide. The proteins were precipitated from the filtrates with 0.9 ammonium sulfate saturation, redissolved in 0.025 M Tris-HCl buffer, pH 7.9 and further fractionated with a series of Sephadex G-, 25, diethylaminoethyl (DEAE)-cellulose and Sephadex G-100 columns as previously reported for short ragweed pollen (King et al., supra) and seeds (Shafiee, A. et al., 1973 — Presence of Antigen E in the Stems and Leaves of Short Ragweed Plant J. Pharm. Sci., Submitted for publication).

The medium obtained from fifth generation suspension culture (Expt III, Table 1, 2,850 ml) was concentrated and fractionated as reported for short ragweed leaves and stems extract (Shafiee et al., supra)

DEAE-cellulose Fraction D obtained from callus culture (Expt I) was resolved into three fractions with a Sephadex G-100 column (100 × 2.5 cm). However, fraction D from suspension culture (Expt II) was resolved into five peaks when a longer Sephadex G-100 column (195 × 2.5 cm) was used.

The procedures for antisera production, disc electrophoresis, Ouchterlony immunodiffusion and patient skin testing were the same as reported previously (Shafiee et al. supra).

Short ragweed leaf callus and suspension cultures were established and grown on Murashige's and Skoog's media containing 1 and 2 ppm 2,4-D, respectively. The growth index, i.e., the ratio of final fresh weight to initial fresh weight of tissue, for 4 weeks old callus culture was 3.4 (Table 1, Expt I). The growth index of third generation suspension cultures collected at 14 days was 4.8. The growth index of suspension cultures collected at 16 days and 17 days was 5.0 and 5.4, respectively, (Table 1, Expt II).

Table 1 represents the Lowry Protein (Lowry et al., 1951 — Protein Measurement with the Folin Phenol Reagent. J. Biol. Chem. 193: 265–275) content of column fractions from short ragweed callus, suspension cells and medium.

While the presence of antigen E in suspension culture fraction D could not be detected by comparative immunodiffusion analysis and disc electrophoresis patterns, two physiologically active fractions were isolated from the Sephadex G-100 column (Expt I or II, fractions II and III). Fractions II and III of Expt I are identical to fractions II and III of Expt II as was established by their similar elution volumes on Sephadex G-100 columns, similar disc electrophoresis mobility and their similar allergenic

TABLE 1

LOWRY PROTEIN CONTENT OF VARIOUS FRACTIONS FROM SHORT RAGWEED LEAF CALLUS AND SUSPENSION CULTURES

| Expt. No. | Material | DEAE-cellulose | Sephadex G-100 Fractions | | |
|---|---|---|---|---|---|
| | | Fraction D (mg) | Fraction I (mg) | Fraction II (mg) | Fraction III (mg) |
| I | 4th generation callus tissue (625 g F. Wt.)* | 18 | 1.65 | 6.50 | 0.54 |
| II | 4th & 5th gen. susp. tissues (1,787 g F. Wt.) | 50 | 11.57 | 11.05 | 4.50 |
| III | 5th generation medium (2850 ml) | 3 | — | — | — |

In Expt II the first three peaks from the Sephadex G-100 column, which had molecular weights higher than 60,000, were pooled and constitute fraction I. The remaining two peaks, fractions II and III, were separately pooled, concentrated and dialyzed in preparation for immunological and disc electrophoretic testing. The DEAE-cellulose fraction D obtained from medium (Expt III) was not further fractionated. The approximate molecular weight of the tissue culture fractions were estimated (by the method of T. P. King, 1968. In: Williams and Chase (eds.), Methods in Immunology and Immunochemistry. Volume II, Academic Press, New York, pp. 135–142) using a Sephadex G-100 column (195 × 2.5 cm) calibrated with horse cytochrome C (Schwarz/Mann, Orangeburg, New York), β-lactoglobulin (3 × crystallized, 95 percent purity, Schwarz/Mann) and crystalline bovine albumin (Nutritional, Biochemical, Cleveland, Ohio).

activity in short ragweed sensitive individuals. In both Expt I and II, fraction II was distinctly red colored and had maximum absorption at 280 and 405 nm.

Comparison of the immunodiffusion reactions of tissue culture fraction D. Sephadex G-100 fractions I-III, and National Institutes of Health antigen E (NIH antigen E) against anti-pollen crude extract or anti-antigen E sera shows that a complete line of non-identity exists between suspension culture fraction D and NIH antigen E when tested against anti-pollen crude extract serum. No precipitin line was formed between anti-antigen E serum and various Sephadex G-100 fractions when tested in concentration range of 0.01-1 mg protein/ml. The tissue culture extracts tested did not contain a common line of identity with antigen E, nor form a precipitin line with anti-antigen E serum. However, the net electrophoretic charges of the tissue culture single band fractions II and III is possibly identical to B form

TABLE 2

ALLERGENIC ACTIVITY OF TISSUE CULTURE FRACTIONS AND SHORT RAGWEED POLLEN ANTIGEN E

| Patient | Callus Culture | | Suspension Culture | | Short Ragweed Pollen |
|---|---|---|---|---|---|
| | Fraction II sp. act.[+] (units/mg) | Fraction III sp. act. (units/mg) | Fraction II sp. act. (units/mg) | Fraction III sp. act. (units/mg) | Pollen antigen E sp. act. (units/mg) |
| B.P. | $2 \times 10^5$ | $5 \times 10^4$ | $1 \times 10^5$ | $3 \times 10^5$ | $3 \times 10^8$ |
| M.F. | $2 \times 10^5$ | $5 \times 10^5$ | $1 \times 10^4$ | $3 \times 10^6$ | $3 \times 10^9$ |
| D.D. | $2 \times 10^3$ | $5 \times 10^3$ | $1 \times 10^3$ | $2.5 \times 10^3$ | $3 \times 10^7$ |
| D.A. | $2 \times 10^3$ | $5 \times 10^4$ | $1 \times 10^4$ | $2.5 \times 10^4$ | $3 \times 10^8$ |
| C.G. | $2 \times 10^6$ | $5 \times 10^6$ | $1 \times 10^6$ | $3 \times 10^6$ | $3 \times 10^{10}$ |
| T.K. | $2 \times 10^4$ | $5 \times 10^4$ | —* | $3 \times 10^4$ | —* |
| S.B. | $2 \times 10^4$ | $5 \times 10^4$ | $1 \times 10^5$ | $3 \times 10^6$ | $3 \times 10^{10}$ |
| R.W. | $2 \times 10^6$ | $2 \times 10^6$ | $1 \times 10^5$ | $3 \times 10^6$ | 11 $3 \times 10^{10}$ |

\* This patient gave a positive skin reaction to commercial short ragweed pollen extract.
[+] Specific activity as suggested by Berrens.

of pollen antigen E. (T. P. King et al., Biochemistry 3, 458, 1964)

Tissue culture fractions II and III had approximate molecular weights of 30,000–40,000 and 10,000–15,000, respectively, as determined from their emergence positions and that of known molecular weight standards from a Sephadex G-100 column. The molecular weight of antigen E is reported to be 37,800. It, therefore, appears that the molecular weights and net charges of the two tissue culture fractions II and III may be similar to those of short ragweed pollen antigen E (B form) and King's fraction VI$_2$A (T. P. King et al. 1962 — Isolation Studies of Allergens from Ragweed Pollen. Biochem. 1: 709 – 720).

The similarity in electrophoretic charges at pH 8.9 and molecular weights to that of short ragweed pollen antigen E prompted examination of skin reactivity of these two tissue culture fractions. Preliminary results obtained by direct skin testing of short ragweed pollen sensitive individuals indicate that the two tissue culture fractions have an allergenic activity of about 1/1,000 to 1/10,000 of that of short ragweed pollen antigen E.

Table 2 shows the specific activity of two tissue culture fractions and NIH antigen E in terms of units/mg. One unit represents the minimum quantity of the fraction (mg Lowry protein) eliciting a minimum reaction in specifically sensitive patients in this system. Eight short ragweed pollen sensitive indivduals were tested and results established an allergenic activity of about 1/1,000 of that of short ragweed pollen antigen E. Four non-sensitive volunteers were also tested with the highest concentration of the tissue culture fractions and NIH antigen E with no skin reaction, therefore, obviating the positive skin reaction of the sensitive individuals as being a toxic response. Specific allergic response and involvement of IgE antibodies was further confirmed by sensitizing a normal volunteer with appropriate ragweed allergic serum (P-K Test). The sensitized skin sites were separately challenged with the two tissue culture fractions, their single protein band eluted from unstained gel cuts at the region of stained standard antigen E, NIH antigen E and buffered saline. The results were essentially similar to those obtained by direct skin testing.

It is apparent that many modifications and variations of this invention as hereinbefore set forth may be made without departing from the spirit and scope thereof. The specific embodiments described are given by way of example only and the invention is limited only by the terms of the appended claims.

The embodiments of the invention in which an exclusive property or privilege is claimed are defined as follows:

1. A process for the production and isolation of specific ragweed allergens from cultures of short ragweed plants which comprises aseptically growing cells derived from tissue of said plants under tissue growth conditions in a nutrient medium and separating the allergens from said cells.

2. A process according to claim 1 further characterized in that said cells are grown in aqueous suspension cultures.

3. A process according to claim 1 further characterized in that said cells are grown in static cultures.

4. A process according to claim 1 further characterized in that said allergens are separated and isolated from the cultures by precipitation and chromatographic fractionation.

5. A process according to claim 1 further characterized in that said nutrient medium contains a growth-promoting agent in growth-promoting amounts.

6. A process according to claim 5 further characterized in that said growth promoting agent is 2,4-D present in amount between about 1 and 2 ppm.

7. A process for the production and isolation of specific ragweed allergens from cultures of short ragweed plants which comprises:
   A. aseptically growing cells derived from tissue of short ragweed plants under tissue growth conditions in a nutrient medium,
   B. separating said cells from an aqueous suspension of the medium by precipitation, and
   C. fractionating the precipitate to recover ragweed allergens.

8. A process according to claim 7 further characterized in that said medium is selected from the class consisting of revised tobacco and Prairie Regional Laboratory media, said cells are precipitated by ammmonium sulfate and said allergens are isolated by fractionation by chromatographies selected from the class consisting of diethylaminoethyl cellulose and filtration gels.

9. A process according to claim 7 further characterized in that said cells are derived from short ragweed leaves.

10. A process according to claim 7 further characterized in that said nutrient medium contains a growth-promoting agent in growth-promoting amounts.

11. A process according to claim 10 further characterized in that said growth promoting agent is 2,4-D present in amount between about 1 and 2 ppm.

12. Ragweed allergens produced by the process of claim 7.

\* \* \* \* \*

PO-1050
(5/69)

UNITED STATES PATENT OFFICE
CERTIFICATE OF CORRECTION

Patent No. 3,846,937                           Dated November 12, 1974

Inventor(s)   E. John Staba et al

It is certified that error appears in the above-identified patent and that said Letters Patent are hereby corrected as shown below:

Column 2, line 5, "rspectively" should be --respectively--.

Column 2, line 46, "Mode-53" should be --Model-53--.

Column 3, line 16, "G-, 25," should be --G-25,--.

Table 2, last column, last line, "11 $3 \times 10^{10}$" should be --$3 \times 10^{10}$--.

Signed and sealed this 7th day of January 1975.

(SEAL)
Attest:

McCOY M. GIBSON JR.
Attesting Officer

C. MARSHALL DANN
Commissioner of Patents